United States Patent [19]
Miskowic

[11] Patent Number: 6,106,051
[45] Date of Patent: Aug. 22, 2000

[54] TRUCK BED COVER

[76] Inventor: Michael J. Miskowic, 26747 Fremont Dr., Zimmerman, Minn. 55398

[21] Appl. No.: 09/212,918

[22] Filed: Dec. 16, 1998

[51] Int. Cl.[7] ........................................... B60P 7/02
[52] U.S. Cl. .................. 296/100.09; 296/100.06
[58] Field of Search .............. 296/100.02, 100.04, 296/100.06, 100.07, 100.09; 52/5, 71

[56] References Cited

U.S. PATENT DOCUMENTS

| | | | |
|---|---|---|---|
| 3,420,570 | 1/1969 | Kunz | 296/100.06 |
| 4,313,636 | 2/1982 | Deeds | 296/100.09 |
| 4,418,954 | 12/1983 | Buckley | 296/100.09 |
| 4,747,441 | 5/1988 | Apolzer et al. | 296/100.09 |
| 4,832,394 | 5/1989 | Macomber | 296/100.06 |
| 4,844,531 | 7/1989 | Kooiker | 296/100.09 |
| 4,861,092 | 8/1989 | Bogard | 296/100.09 |
| 4,946,217 | 8/1990 | Steffens et al. | 296/100.09 |
| 5,011,214 | 4/1991 | Friesen et al. | 296/100.09 |
| 5,427,428 | 6/1995 | Ericson et al. | 296/100.09 |
| 5,595,417 | 1/1997 | Thoman et al. | 296/100.09 |
| 5,857,729 | 1/1999 | Bogard | 296/100.09 |
| 5,961,173 | 10/1999 | Repetti | 296/100.09 |

FOREIGN PATENT DOCUMENTS 225691   12/1957   Australia ..................................... 52/5

*Primary Examiner*—Joseph D. Pape
*Assistant Examiner*—Kiran Patel
*Attorney, Agent, or Firm*—Nawrocki, Rooney & Sivertson, P.A.

[57] ABSTRACT

A pickup truck bed cover having a flexible envelope disposed about a rigid panel. One cover is formed of a vinyl material encompassing a rigid, expanded polystyrene panel reinforced with embedded steel members. The rigid panels are preferably removable through reversibly closable slits in the flexible envelope. One cover has a seam or hinge extending along an axis from front to rear, allowing the cover to be swung open to expose either the right or left half of the pickup truck bed. One cover is foldable along a seam or hinge and has handles, allowing the cover to be folded in two and either stowed within the truck bed or carried from the vehicle.

22 Claims, 3 Drawing Sheets

TRUCK BED COVER

FIELD OF THE INVENTION

The present invention relates generally to protective covers for pickup trucks. More specifically, the present invention relates to pickup truck bed covers having a rigid insert within a flexible envelope.

BACKGROUND OF THE INVENTION

Pickup trucks have come into increasing use, particularly among drivers not using the hauling capability of the truck at all times. The appearance of the truck has become more important, and hence protecting the truck bed from the elements. In particular, it has become more important to protect the truck bed from the elements when the truck bed is not in use. At the same time, the truck bed should be accessible for hauling when required.

One solution has been to form a rigid panel out of a material which resembles the truck body itself. The rigid panel can be formed out of fiberglass, and painted and polished to match the truck color and finish. The panel can be mounted on the pickup truck bed rails to cover the bed and removed when use of the truck bed is desired. The panel is usually removed from the truck and stored when the truck is to be used for hauling. This removal and storage is best accomplished when the truck is at the owners residence or business, and the hauling activity is known ahead of time. Spontaneous removal of the large, rigid cover is less than optimal, as the cover must be placed in the truck bed if removed while away from a storage location. The rigid cover does not typically lie flat within the truck bed, but rather has one end sticking up above the truck rails.

Another solution has been to form a flexible cover having a series of fasteners or snaps about the periphery. The cover can be removed and stored in the truck bed upon short notice. The cover, resembling a tarp, can be secured to the top of the truck bed rails such that the cover is relatively taught. The cover is nonetheless formed of flexible material, and suffers from limitations including tearing, weak support for any loads, and pooling of water and snow near the center. The cover is also relatively cumbersome to open and shut, as it requires snapping and unsnapping numerous snaps.

What would be desirable is a rigid pickup bed cover adapted to being easily opened and shut. What would be desirable is a rigid pickup bed cover capable of being folded and stored within the pickup truck bed.

SUMMARY OF THE INVENTION

The present invention relates to a pickup truck bed cover having a flexible envelope disposed about a rigid panel. One cover according to the present invention has a reversibly closable slit along one side of the envelope, with the panel being removable through the slit. One cover has the panels disposed on either side of an axis through the cover, the envelope being foldable along the axis into at least two layers. One truck cover has an axis extending from front to rear, allowing the cover to be opened to expose the right or left side of the truck bed. Another truck cover has an axis extending from right to left, allowing the cover to be opened to expose the front or back of the truck bed. A preferred cover includes a panel formed of a rigid foam material. A preferred foam material includes expanded polystyrene. One foam material includes reinforcing members embedded within, such as steel channel, rods or bars.

One truck bed cover is secured to the truck bed rails using fastening members attached to the rail tops which can protrude through slots in the cover. The fastening members can be turned after insertion through the slots, securing the covers. One cover is secured to the truck bed rails using fastening members having apertures or eyes therein. The fastening members can be inserted through holes in the cover, disposing the eyes above the cover surface. Elongate members such as rods, poles, or bungee cords can be attached between fastener eyes across the tops of the covers.

In use, the cover can be secured to the bed rails, protecting the truck bed. When access to the bed is desired, one portion or panel of the cover can be unsecured and swung open about an axis through the cover, thus exposing part of the truck bed. The cover can later be closed in the same manner. When use of the entire truck bed is desired, the entire cover can be unsecured, folded and removed. Depending on the exact geometry of the truck bed, the folded cover may be laid flat in the truck bed.

A preferred cover has an expanded polystyrene rigid panel disposed within a flexible vinyl envelope or skin. A preferred material is a vinyl boat cover material polyester-backed vinyl material. The rigid panel is preferably removable through a zippered slot in the cover. The rigid panel can thus be replaced through the slot if damaged. The foldable cover preferably includes handles, allowing the cover to be folded and easily carried to and from the vehicle.

BRIEF DESCRIPTION OF THE DRAWINGS

FIG. 4 is a perspective, cutaway view of a fastener for securing a truck bed cover to a truck bed rail.

DETAILED DESCRIPTION OF THE INVENTION

Figure 1:
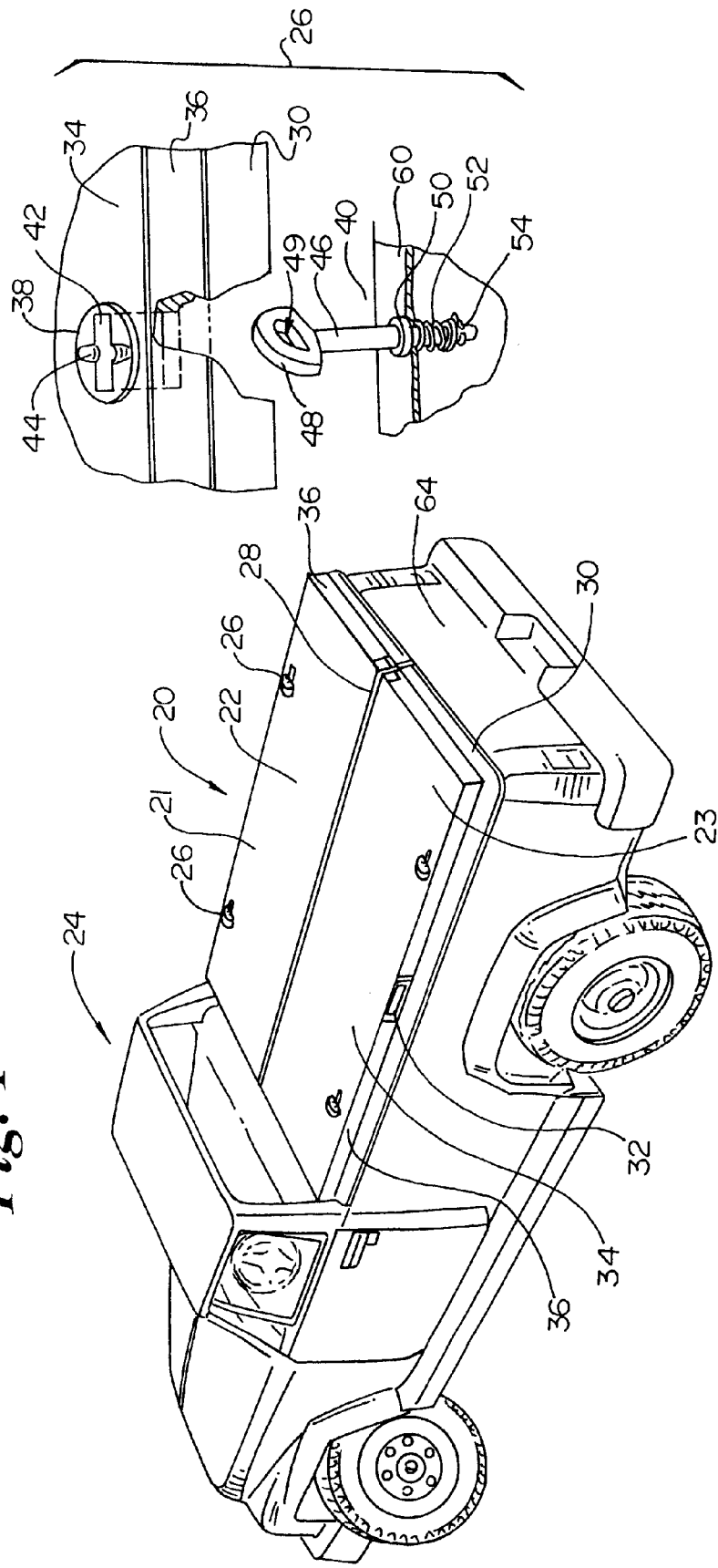
FIG. 1 is a perspective view of a pickup truck having a truck bed cover installed over the bed.
Figure 2:
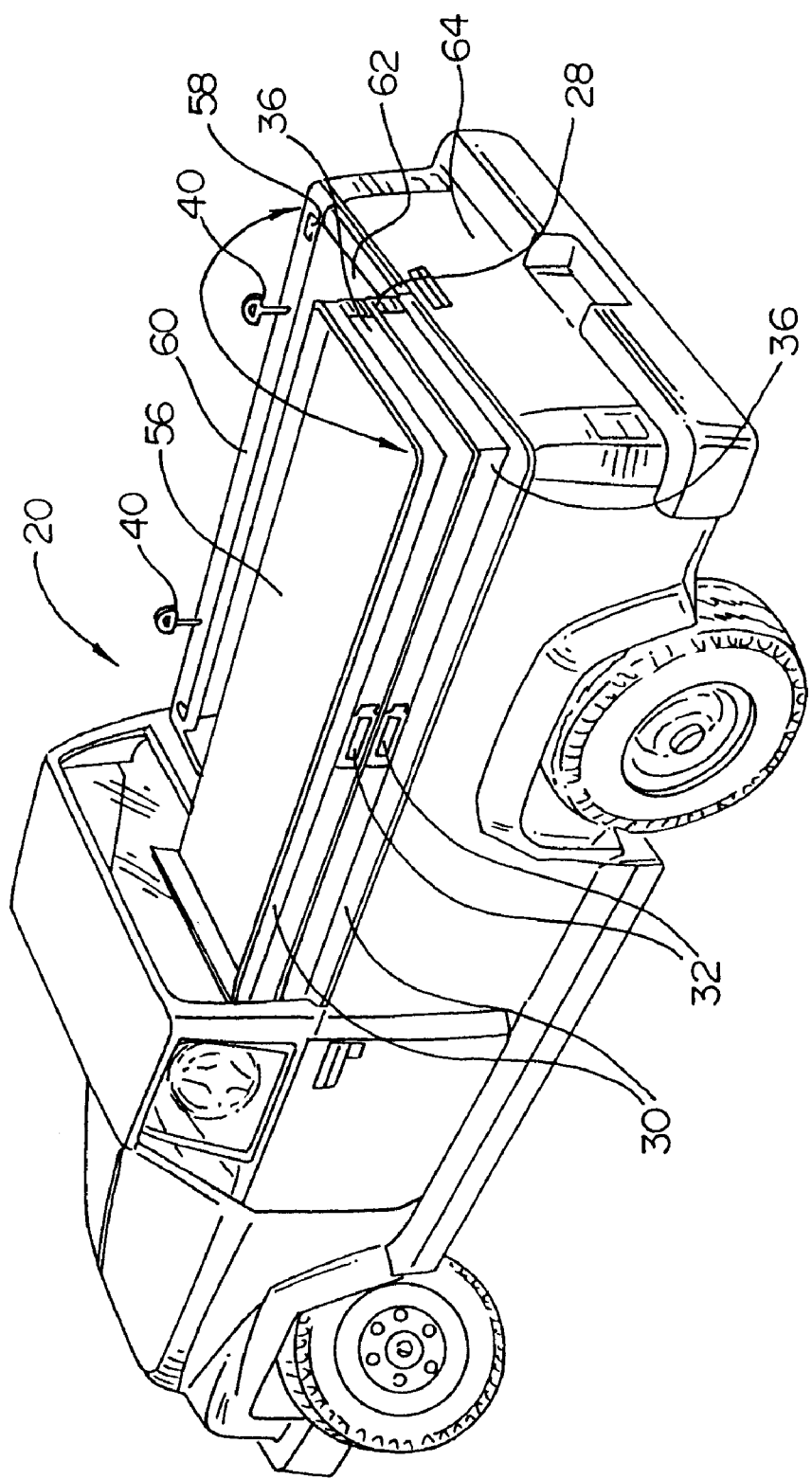
FIG. 2 is a perspective view of the truck and cover of FIG. 1 illustrating the cover opened along a hinge.

FIG. 1 illustrates a pickup truck 24 having a truck bed cover 20 covering a truck bed 62 (illustrated in FIG. 2). Truck bed cover 20 lies atop a right and a left bed rail 60 (illustrated n FIG. 2) and, in the truck illustrated in FIG. 1, atop a tailgate 64. An envelope or outer skin 21 constitutes the majority of the visible portion of cover 20. In the embodiment illustrated, cover 20 is partitioned into a right portion 22 and a left portion 23, divided along a seam or hinge 28. In the embodiment illustrated, seam 28 runs from front to rear. In another embodiment, the seam runs from side to side. The embodiment illustrated includes only a single seam, while other embodiments include two or more seams.

Cover 20 includes a top surface 34 and side surfaces 36. Extending downward from side surfaces 36 is a skirt or flap 30, shown extending over the exterior sides of the truck bed rails. In a preferred embodiment, flaps 30 are secured with the inclusion of an embedded magnetic material to adhere to the metallic truck body. Cover 20 is secured to truck 24 with fastener assemblies 26. In one embodiment, cover side surface 36 includes a handle 32.

Referring now to FIG. 2, cover 20 is illustrated in an open position, being folded only seam 28, causing right portion 22 and left portion 23 to lie atop each other. A bottom surface 56 of cover is exposed. As illustrated, cover 20 is in a configuration capable of being removed from truck 20 and carried by handles 32. A male fastener member 40 is illustrated, forming part of fastener assembly 26. Fastener member 40 is preferably mounted to bed rail 60 through a preexisting hole, such as a rail post hole 58. In one embodiment, not requiring illustration, fastener member 40 is mounted in a rail hole using an expandable rubber plug adapted to expand and be held within the hole by compression.

Figure 3:
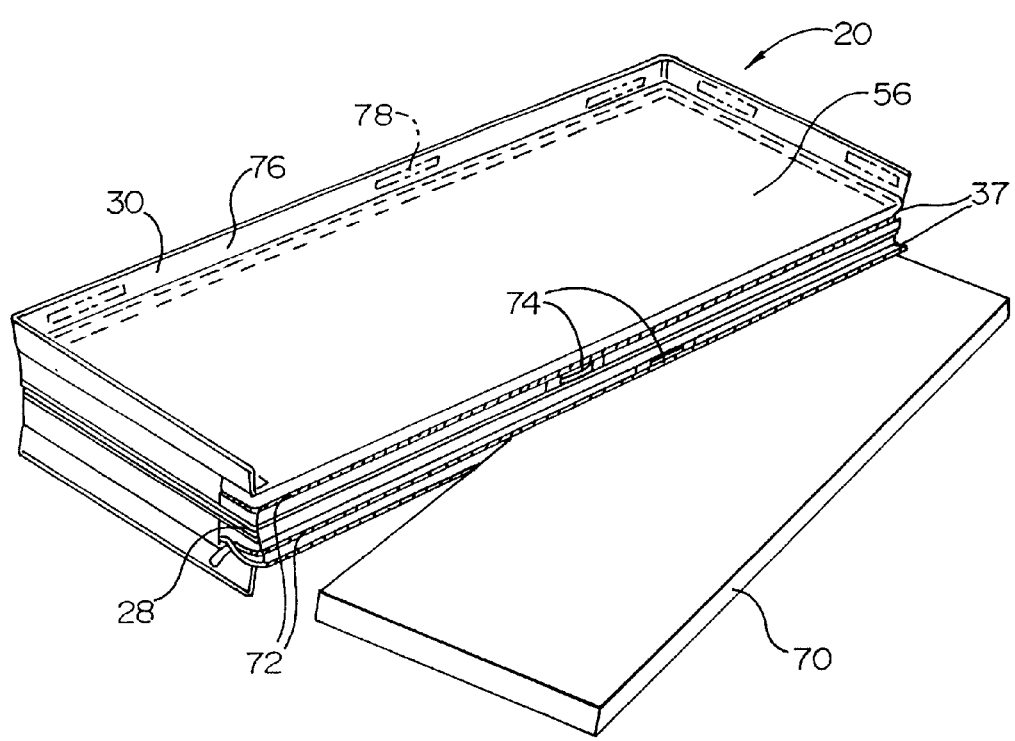
FIG. 3 is a perspective view of the truck bed cover of FIG. 1, illustrating flaps, handles, and zippered slits.

Referring now to FIG. 3, cover 20 is illustrated in a folded configuration, exposing bottom surface 56, interior side surfaces 37, and an inside surface of flap 30. Flap 30 includes several magnetic strips 78 embedded within, drawn in phantom. A zippered slit 72 is shown extending the length of each interior side surface 37. In one embodiment a hook and loop fastener such as VELCRO is used to reversibly close a slit in interior side surface 37. In another embodiment, a plurality of snaps is used to close a slit in interior side surface 37.

A pair of inside handles 74 is shown secured to interior side surfaces 37. One zippered slit 72 is shown in open position, with a rigid panel insert 70 partially removed. In a preferred embodiment, a polymeric, rigid foam material is used to form panel 70. In one embodiment, expanded polystyrene is included in panel 70. In one embodiment, a plurality of elongate, rigid, reinforcing members is embedded within panel 70. In a preferred embodiment, elongate metal members are embedded within expanded polystyrene. The reinforced polystyrene provides a lightweight yet rigid panel capable of maintaining a planar shape across the opposing truck bed rails. The cover is thus formed of a flexible outer envelope or skin and a rigid panel insert disposed within the envelope. In the embodiment of FIG. 3, the envelope is divided into two portions connected by seam 28 along which the portions are folded or hinged. In one embodiment, the envelope is a single envelope not partitioned into two portions or sub-envelopes. In one embodiment, a single envelope contains at least two rigid panels that can be pulled apart such that the envelope can be folded along the space between the two panels. In one embodiment, a single slit along one side allows all panels to be removed through the single slit. In a preferred embodiment, as illustrated in FIG. 3, the envelope is partitioned into two portions which can be folded along a common seam, with each rigid panel being removable through an interior reversibly closable slit.

Referring now to FIG. 4, fastener assembly 26 is further illustrated, including a female fastener receptacle or washer 38 and a male fastener member 40. Female fastener 38 includes an elongate slot 42 and detents 44. Male member 40 includes a post 46, a head 48, and an aperture or eye 49. In one embodiment, post 46 is adapted to fit through a hole in bed rail 60 secured by a top washer 50, biased by a spring 52, and secured by a bottom cotter key 54. In this embodiment, head 48 can be pulled upward against the force of spring 52, through female slot 42, rotated, and released within detents 44. In one embodiment, multiple fastener heads extend through apertures in cover 20 and cover 20 is secured by attaching an elongate member to at least two fastener heads. In one embodiment, a rigid elongate member such as PVC pipe is extended from side to side across the truck bed and through an eye on each end, thus securing the cover to the truck bed and preventing any independent cover portions from opening. In one embodiment, an elastic elongate member such as a bungee cord is secured at each end to an eye, securing the cover to the truck bed.

In use, a truck bed cover according to the present invention is provided, for example having a flexible envelope with top, bottom, and side surfaces, and at least two rigid panels disposed, side by side, within the envelope. The envelope is preferably partitioned into two portions or envelopes by a seam or dividing axis running from front to back, such that the cover is foldable along the axis into two layers, with each layer having one rigid panel within. The cover preferably has several elongate fastening apertures therethrough, adapted to receive fastening members. A pickup truck to be covered can be equipped with fastening members protruding upward from the truck bed rail.

The cover can be unfolded such that the cover is flat, and disposed with the fastening apertures disposed over the fastening members. The cover can then be lowered onto the fastening members. With the fastening members protruding through the apertures, a variety of methods can be used to secure the cover to the fastening members. According to one method, the fastening members provided have elongate heads attached to spring loaded posts which bias the heads downward. The heads are inserted through fastening apertures in the cover, pulled against the bias, rotated 90 degrees, and released so as to come to rest orthogonally to the elongate apertures. According to another method, the fastening heads have eyes or apertures therethrough, and the eyes are used to connect straps, poles, cords, or bungee cords between fastening members. The poles or cords thus reach over the cover between fastening members, holding the cover down. In a preferred embodiment, a skirt or flaps extend downward from the cover sides to cover a top portion of the rail outside surfaces. In one embodiment, the flaps include magnetic materials so as to cling to a metallic truck body exterior, thereby providing a weather resistant seal.

With the pickup truck bed being covered with the present invention, objects can be placed within the truck bed by unfastening one portion of the cover and swinging it about the hinge or seam, thereby making accessible part of the truck bed. If the objects fits within the truck bed, the portion can be swung closed and re-fastened. If the object protrudes above the bed rails, the cover portion can be secured ad hoc in a folded position, leaving half of the bed covered. If more of the bed is required, the cover can be completely detached, folded, and placed in the truck bed. In covers having a hinge or seam extending from side to side, the cover can be placed entirely in the truck bed, near the floor. In covers having a hinge extending from front to back, in some bed geometries, the cover may not be able to lie down completely in the truck bed with a tailgate closed. In this situation, the folded cover may lay obliquely in the truck bed.

In use, the rigid interior panels of the cover may become broken. In this situation, embodiments having reversibly closable slits in the covers have the advantage of being repairable. A preferred cover has a zipper slit large enough to remove the rigid panel within. The slit can be opened, the broken panel removed, a new rigid panel placed within, and the zippered slit re-closed. The replacement rigid panel is preferably formed of rigid, expanded polystyrene having elongate reinforcing members embedded within.

When it is desirable to remove the cover from the truck, the cover can be detached, folded into layers, and carried from the truck. In a preferred embodiment, handles are attached to the cover sides such that the cover can be carried by the handles after folding.

Variations to the illustrated embodiments are within the scope of the invention. In particular, some covers have three or more portions foldable along seams, with each portion having a rigid panel within. The seams and rigid panels can be aligned, lying next to each other, from either front to back or from side to side.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A removable truck bed cover comprising:

a flexible envelope including a top surface, a bottom surface, and a plurality of side surfaces disposed between said top and bottom surfaces;

a rigid panel disposed within said envelope; and wherein at least one of said side surfaces has a reversibly closable slit therein and said rigid panel is removable through said slit.

2. A removable truck bed cover as recited in claim 1 wherein said envelope has at least two of said rigid panels disposed on either side of an axis through said cover, said envelope being foldable along said axis, such that said cover can be folded into at least two layers.

3. A removable truck bed cover as recited in claim 2 wherein said rigid panel includes a polymeric foam material.

4. A removable truck bed cover as recited in claim 3 wherein said polymeric foam material includes expanded polystyrene.

5. A removable truck bed cover as recited in claim 3 wherein said polymeric foam material includes reinforcing members.

6. A removable truck bed cover as recited in claim 5 wherein said reinforcing members include elongate metal members.

7. A removable truck bed cover comprising:

a number of flexible envelopes including a top surface, a bottom surface, and a plurality of side surfaces disposed between said top and bottom surfaces, said number of envelopes being at least two;

a rigid panel disposed within said envelops; and wherein at least one of said side surfaces has a reversibly closable slit therein and said rigid panel is removable through said slit.

8. A removable truck bed cover as recited in claim 7 wherein said envelopes are joined together along said sides along an axis and foldable along said axis.

9. A removable truck bed cover as recited in claim 8 wherein said truck bed has a front and a back and said axis runs from said front to said back.

10. A removable truck bed cover as recited in claim 9 wherein said number of envelopes is two.

11. A removable truck bed cover as recited in claim 10 wherein said envelope slits are reversibly closable with a zipper.

12. A removable truck bed cover as recited in claim 10 wherein said truck bed includes rail tops having male fastening members extending therefrom and said envelopes include apertures for receiving said male fastening members.

13. A removable truck bed cover as recited in claim 8 wherein said rigid panels include polymeric foam material.

14. A removable truck bed cover as recited in claim 13 wherein said rigid panels include expanded polystyrene.

15. A removable truck bed cover as recited in claim 13 wherein said rigid panels include elongate reinforcing members embedded therein.

16. A removable truck bed cover as recited in claim 8 further comprising at least one flap extending from at least one of said envelope sides, said flaps including magnetic material adapted to cling to said truck bed rails.

17. A method for covering a truck bed including at least two side rails having rail top surfaces comprising the steps of:

providing a flexible envelope including a top surface, a bottom surface, and a plurality of side surfaces disposed between said top and bottom surfaces, and at least two rigid panels disposed within said envelope;

disposing said envelope over said truck bed; and fastening said envelope to said rail top surfaces.

18. A method for covering a truck bed as recited in claim 17 further comprising the steps of providing fastening members protruding from said rails, providing apertures through said envelopes adapted to receive said fastening members therethrough, wherein said fastening step includes inserting said fastening members through said apertures.

19. A method for covering a truck bed as recited in claim 18 wherein said fastening members are rotatable, said apertures are elongate, and said fastening step includes rotating said fastening members after said insertion step.

20. A method for covering a truck bed as recited in claim 18 further comprising the step of providing an elongate member, wherein said fastening step includes attaching said elongate member between at least two of said fastening members.

21. A method for covering a truck bed as recited in claim 18 wherein said envelopes are joined together along said sides along an axis and foldable along said axis, wherein said disposing step includes unfolding said envelopes such that the envelopes are oriented along a common plane.

22. A removable truck bed cover as recited in claim 18 wherein at least one of said side surfaces has a reversibly closable slit therein and said rigid panel is removable through said slit.

* * * * *